United States Patent [19]

Bertram et al.

[11] Patent Number: 5,022,315
[45] Date of Patent: Jun. 11, 1991

[54] SMALL ELECTRIC HOUSEHOLD UTENSIL FOR THE PRODUCTION OF FOODS BY MIXING BY STIRRING

[75] Inventors: Leo Bertram, Stolberg, Fed. Rep. of Germany; Hugo Schemmann, Schaesberg, Netherlands; Romuald L. Bukoschek, Klagenfurt, Austria

[73] Assignee: U.S. Philips Corporation, New York, N.Y.

[21] Appl. No.: 380,179

[22] Filed: Jul. 14, 1989

[30] Foreign Application Priority Data

Jul. 21, 1988 [DE] Fed. Rep. of Germany ....... 3824821

[51] Int. Cl.[5] .............................................. A23G 9/00
[52] U.S. Cl. ....................................... 99/348; 62/342; 62/437; 366/144
[58] Field of Search .................. 99/348, 483, 485; 366/144, 145, 146, 147, 149, 244, 245, 247, 248, 249, 251, 220; 62/340, 342, 343, 437

[56] References Cited

U.S. PATENT DOCUMENTS

| | | | |
|---|---|---|---|
| 1,956,621 | 5/1934 | Parker | 366/144 |
| 2,608,833 | 9/1952 | Woodruff | 62/342 |
| 4,070,957 | 1/1978 | Korekawa | 62/342 |
| 4,189,241 | 2/1980 | Baldacci | 366/245 |
| 4,551,026 | 11/1985 | Cristante | 366/149 |
| 4,664,529 | 5/1987 | Cavalli | 366/149 |

FOREIGN PATENT DOCUMENTS 2825997 1/1979 Fed. Rep. of Germany .

Primary Examiner—Robert W. Jenkins
Attorney, Agent, or Firm—Ernestine C. Bartlett

[57] ABSTRACT

The invention relates to a small electric household utensil for the production of foods by mixing by stirring from original components which are slightly liquid at the start of work, in the preparation of which foods the production temperature deviates from the ambient temperature, the temperature change in the original components which is required during the production process being achieved by means of a thermal energy dispenser, the thermal energy dispenser (6) bringing the inner wall (4a) of a pot-shaped container (4, 24) to the production temperature and a stirring tool (10) intermixing the production components during the production process. At least two pot-shaped containers (4, 24) are arranged in a common surrounding container (3), in which there are thermal energy dispensers (6) in contact with the containers (4, 24); an individual stirring tool (10) is assigned to each pot-shaped container (4, 24); the relative speed, necessary for mixing, of the respective stirring tool in relation to the assigned pot-shaped container (4, 24) can be achieved by means of independent drive devices (9, 28) with their own electric motors (16).

12 Claims, 2 Drawing Sheets

SMALL ELECTRIC HOUSEHOLD UTENSIL FOR THE PRODUCTION OF FOODS BY MIXING BY STIRRING

FIELD OF THE INVENTION

The invention relates to a small electric household utensil for the production of foods by mixing by stirring from original components which are slightly liquid at the start of work, in the preparation of which foods the production temperature deviates from the ambient temperature, the temperature change in the original components which is required during the production process being achieved by means of a thermal energy dispenser, the thermal energy dispenser bringing the inner wall of a pot-shaped container to the production temperature and a stirring tool intermixing the production components during the production process.

BACKGROUND OF THE INVENTION

Small electric household utensils of this type are known and are used for the production of frozen sweet dishes. Such utensils have a twin-walled container, in which the cavity between the container walls is filled with a coolable cold-storing medium. The original components, which are required for the production of the sweet dish in question, are put into such containers, whereupon the production of the sweet dish is carried out, with manually effected or motor-operated rotary movement of a stirring tool, by cooling, intermixing and solidification of the original components.

With the production of larger quantities of the foods, difficulties can arise in achieving uniform intermixing of the original components, so that an unsatisfactory non-homogeneous consistency of the end product results. A further disadvantage, with the product of larger quantities of ice cream, is that the sweet dish, for example ice cream begins to melt after removal from the utensil and the pleasure of consumption is impaired.

Furthermore, within the scope of an attractive dessert, it is desirable to serve not only one sort of sweet dish, but to increase the range and the selection possibilities by means of different tastes or different original components with varying preparation parameters. This is also the case when diet or health factors have to be taken into consideration, which only apply to a select group of consumers.

With the production of smaller quantities of food, with which the interior of the container is only partially filled, difficulties with regard to the consistency can also arise, e.g. because the cooling process then takes place too quickly.

SUMMARY OF THE INVENTION

An object of the invention is to provide a small electric household utensil of the type mentioned in the introduction, with which according to choice larger or smaller quantities of a desired food can be produced with constantly good intermixing and consistency and it is possible to choose with regard to the quantity to be produced. An object of the invention is also to provide a possibility for the production of different foods from different basic components with varying production parameters, in order to be able to meet different requirements.

The said object is achieved according to the invention by at least two pot-shaped containers arranged in a common surrounding container, the surrounding container having thermal energy dispensers in contact with the pot-shaped containers, and by an individual stirring tool assigned to each pot-shaped container, it being possible to achieve the relative speed, necessary for mixing, of the respective stirring tool in relation to the assigned pot-shaped container by means of independent drive devices with their own electric motors.

By arranging several pot-shaped containers next to one another in a common surrounding container and using separate drives, different foods can be mixed under different conditions, simultaneously or at different times, in a compact unit. Larger or smaller quantities of a desired food can consequently be produced with constantly good intermixing and consistency, there being a wide possibility of choice with regard to the quantities to be produced and storage problems being avoided. Moreover, it is possible to comply with health or diet factors at the same time. For example, in the case of diabetics, the use of sugar can be dispensed with. The compact construction is space-saving and more economical than the use of two completely independent utensils.

According to a further embodiment of the invention, the thermal energy dispenser is a thermal energy storage means, which is brought, before the start of the production process, into a starting state, in which it has stored the energy necessary for the production of the food such as by being frozen, and then imparts this energy to the foods by a change in physical state, such as for example by thawing to the liquid state. The use of such thermal energy stores, which can for example be cooled to the desired temperature in a freezer chest or in the freezer compartment of a refrigerator, is more economical than the use of special cooling units. Moreover, with the use of such thermal energy stores, the working temperature is automatically maintained.

The temperature of such a thermal energy storage means and the temperature at which its physical condition changes, is adjusted to the necessary production temperature of the respective food. In this connection, thermal energy dispensers can be particularly small, because the specific properties of the thermal energy storage means can be usefully utilized, since work is always carried out with the respectively correct physical condition change, as a result of which the conversion energy is utilized optimally.

According to a further embodiment of the invention, thermal energy dispenser may be an electrically operated heating unit. In the case of a heat treatment, the energy production is not so critical. For this reason in such a case it is also possible to fall back upon electrically driven heating units.

According to a further embodiment of the invention, each container is provided with its own thermal energy dispenser, their operating temperatures thus being independent of one another. Separate thermal energy dispensers for the individual containers permit at the same time different heat treatments.

According to a further embodiment of the invention, the thermal energy dispenser is designed for (i) production of ice cream at an operating temperature of $-12°$ C. to $-24°$ C., (ii) cold stirring at an operating temperature of $0°$ C. to $+10°$ C., (iii) keeping warm at an operating temperature of $+30°$ C. to $+50°$ C., (iv) production of creamy sauces at an operating temperature of +60° C. to +90° C.

Additionally the stirring speed of each container is different. By these means, different foods can be produced simultaneously with different stirring speeds.

Switchable gears may be provided for the various stirring speeds. Switchable gears of this type represent a simple solution in terms of construction.

The surrounding container may have separate drive devices for the individual pot-shaped containers with their own electric motors. Likewise, however, it is also possible that the individual stirring mechanisms have their own drive devices with separate electric motors. It is of course also possible that both the pot-shaped containers and the stirring tools are provided with drive devices. The type of drive chosen depends upon the design ideas of the designer. Additionally, the characteristics of the driving electric motors play a role. It is particularly advantageous with regard to the design, if the electric motors are bipolar single-phase synchronous motors with permanent-magnetic armatures. This motor can be constructed with particularly small size. With the use of several motors in one utensil, this can be of decisive importance.

BRIEF DESCRIPTION OF THE DRAWINGS

The invention will be described more closely using the drawings, in which.

DETAILED DESCRIPTION OF PREFERRED EMBODIMENTS

Figure 1:
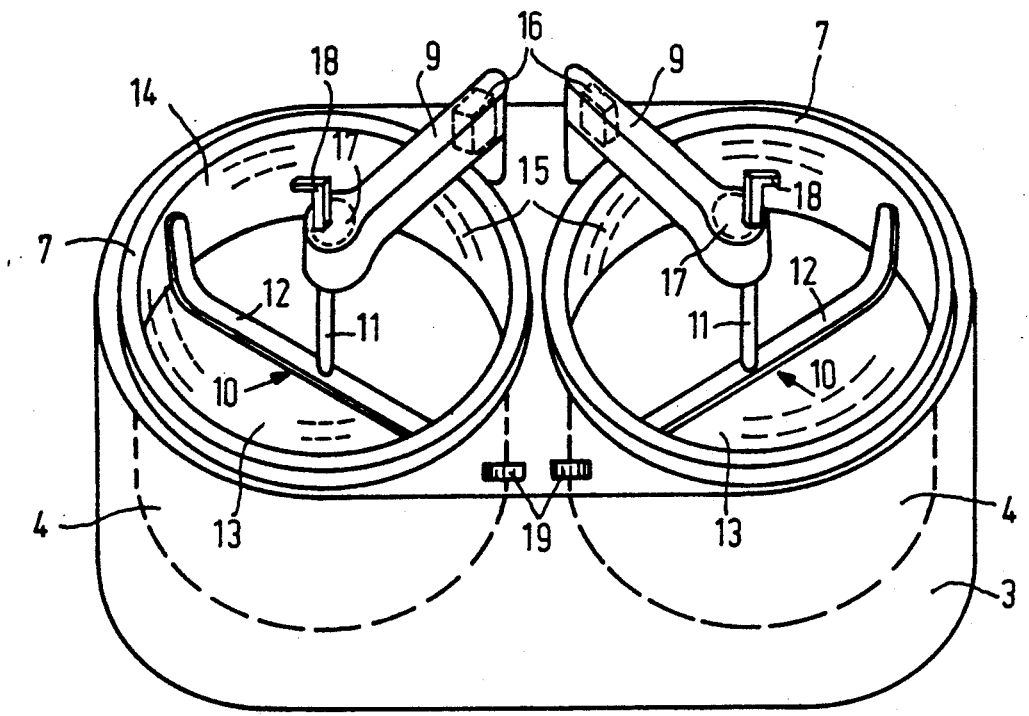
FIG. 1 shows a small electric household utensil with two pot-shaped containers arranged next to one another in a surrounding pot and stirring tools, which extend into these containers and which are held on drive arms.
Figure 2:
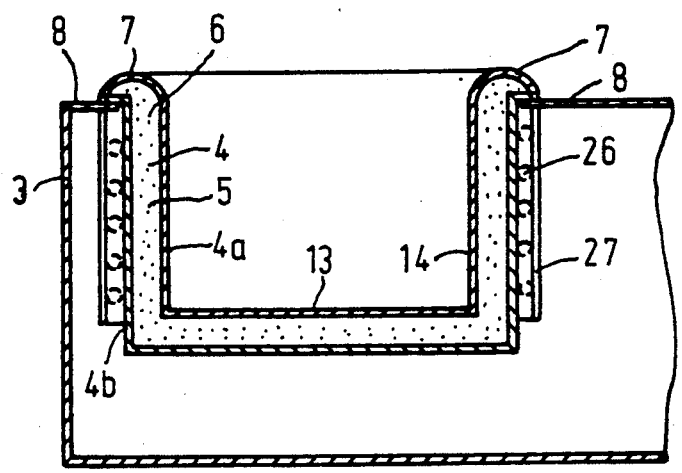
FIG. 2 shows a partial cross-section through a twin-walled pot-shaped container, which is inserted in a surrounding pot, only half of the utensil shown in FIG. 1 being represented in section.

The small electric household utensil represented in FIG. 1 is used for the production of foods which have to be stirred. To this end the household utensil is provided with a surrounding pot 3, in which two pot-shaped containers 4 are inserted next to one another. Base plates, which contain a thermal energy storage means, can be placed in the containers. As shown in FIG. 2, the pot-shaped containers 4 can also have an inner wall 4a and an outer wall 4b, the cavity 5 between inner wall 4a and outer wall 4b being filled with a thermal energy storage means 6. Each of the pot-shaped containers 4 is inserted in the common surrounding container 3, the containers 4 resting with a collar 7 on the upper side 8 of the surrounding container 3.

As shown in FIG. 1, drive arms 9 are provided, which drive stirring tools 10. The stirring tools 10 consist of a vertical drive shaft 11, which is provided with stirring arms 12, which can be rotatably driven in a scraping and stirring manner along the base 13 and the wall 14 of the pot-shaped containers 4. The drive arms 9 are attached removably by latch or snap fastening to the surrounding container 3. The drive shafts 11 extend through lids 15 which, for the sake of clarity, are only indicated in broken lines. The lids are attached to the drive arms 9 and can be removed with these. In the drive arms 9, drive motors 16 are accommodated, which via gears 17 set the drive shafts 11 in rotation. The motors 16 and gears 17 are only represented schematically with dotted lines. The gears 17 are designed in such a manner that they can produce different stirring speeds. The different stirring speeds can be set by means of switching levers 18. The gears 17 are to this end designed as change-speed gears. The electrical connection of the motors 16 in the drive arms 9 is effected by means of switches 19 which can be actuated independently of one another.

As shown in FIG. 1, two pot-shaped containers 4 can be arranged next to one another in the surrounding container 3. Such an arrangement is preferably used for cold treatment.

Figure 3:
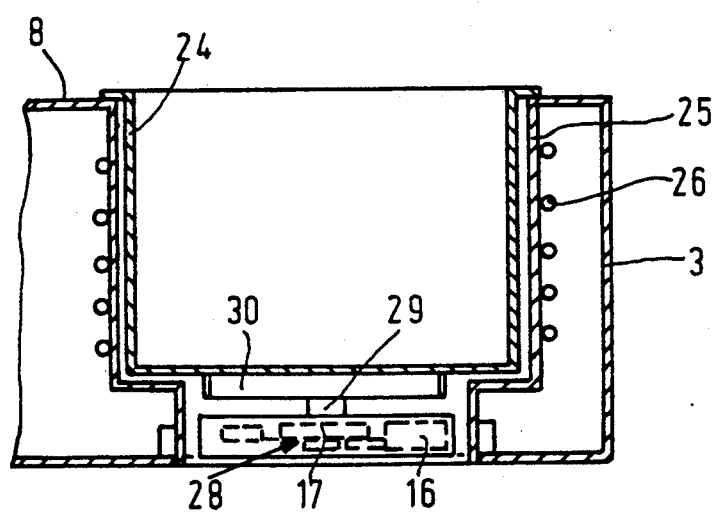
FIG. 3 shows in section a single-walled pot-shaped container, which is arranged in a surrounding pot, which has a receptacle for the pot-shaped container, on which receptacle an electric heating device is provided, the pot-shaped container being in this connection rotatable by means of a drive arranged on the base of the surrounding container.
Figure 4:
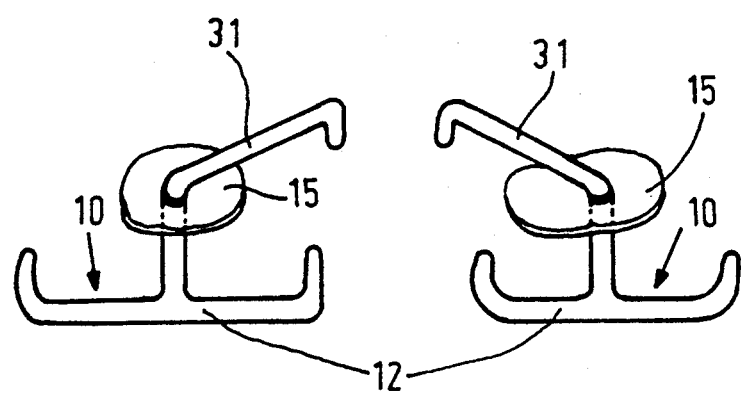
FIG. 4 shows two stirring tools without drive, which are suitable for the pot-shaped container according to FIG. 3 which is rotated from the base.

FIG. 3 shows a modification of the household utensil, in which the pot-shaped container 24 is designed with a single wall. This single-walled pot-shaped container 24 rests in an insert 25, which is also inserted in the surrounding container 3. This insert 25 is provided on its outer side with a heating spiral 26.

In FIG. 2 it is indicated that the heating spiral 26 or also another heating means can be directly arranged on the outer wall 4b of the pot-shaped container 4. In this case, it is not absolutely necessary that the pot-shaped container 4 has two walls. Two walls are, however, advantageous, because then with the thermal energy storage means the phase change in the desired temperature range can be utilized. For reasons of safety, a protective wall 27 is arranged over the heating spiral 26 or the heating means.

Both types of pot-shaped container 4 and 24, with or without heating, can be used next to one another in the surrounding container 3. According to the application, however, it is of course also conceivable to use two pot-shaped containers 4 or 24 next to one another in each case.

As shown in FIG. 3, it is possible to rotate the pot-shaped container 24 in the surrounding container. To this end, a drive unit 28 is provided in the surrounding container 3, with motor 16 and gears 17 indicated. A shaft 29, which projects upwards from the drive unit 28, bears a rotary plate 30, upon which the pot-shaped container 24 rests. In this design, the pot-shaped container 24 does not rest firmly on the upper side 8 of the surrounding container 3. In the same manner, as shown in FIG. 3, the pot-shaped container 4 according to FIG. 2 can of course also be rotary driven from below with the aid of a drive unit 28.

If the pot-shaped container 4 or 24 is set in rotation by the drive unit 28 arranged underneath, the stirring tools 10 do not necessarily have to be driven. In this case, the stirring tools 10 can be attached to the surrounding container by means of a rigid connection 31 and secured against rotation. These rigid connections 31 can also be supported removably by the lids; 15, so that the lids 15 can be removed with the stirring tools 10 and the rigid connections 31 in this exemplary embodiment also. According to the requirements in each case, combinations are of course also possible of drive via the drive unit 28 only, via the drive arms 9 only or via the drive unit 28 and the drive arms 9 together.

In the utensil, each pot-shaped container 4, 24 can be provided with its own thermal energy dispenser, their operating temperatures thus being independent of one another. Thus it is possible that the thermal energy dispenser is designed for the production of ice cream at a temperature of −12° C. to −24° C. For cold stirring it can be designed for an operating temperature of 0° C. to +10° C. For keeping warm, a design for an operating temperature of 30° C. to 50° C. is recommended. If the thermal energy dispenser is a thermal energy storage means, then, before the start of the production process, this is brought, for example in a freezer chest or in a freezer compartment, into a starting state, in which it has stored the energy necessary for the production of the foods and then imparts this to the foods. For heat treatments, the thermal energy storage means can be brought to the desired starting temperature by heating in a water bath.

As electric drive motors 16, bipolar single-phase synchronous motors with permanent-magnetic armatures are preferably used. Such single-phase synchronous motors can be constructed with particularly small size and are thus particularly suitable for multiple use in one utensil.

We claim:

1. A small electric household utensil for the production of foods by mixing by stirring from original components which are slightly liquid at the start of work, in the preparation of which foods the production temperature deviates from the ambient temperature, the temperature change in the original components which is required during the production process being achieved by means of a thermal energy dispenser, the thermal energy dispenser (6) bringing the inner wall (4a) of a pot shaped container (4, 24) to the production temperature; and a stirring tool (10) intermixing the components during the production process, wherein at least two pot-shaped containers (4, 24) are arranged in a common surrounding container (3), thermal energy dispensers (6) being in contact with each of the containers (4, 24) and comprising means by which the operating temperatures of said dispensers are maintained independent of one another; an individual stirring tool (10) being associated with each pot-shaped containing (4, 24), the speed, necessary for mixing, of the respective stirring tool (10) in relation to the respective pot-shaped container (4, 24) being achieved by means of independent drive devices (9, 28) with their respective motors (16).

2. A small electric household utensil according to claim 1, wherein the thermal energy dispenser (6) is designed for
   production of ice cream at an operating temperature of −12° C. to 24° C.,
   cold stirring at an operating temperature of 0° C. to +10° C.,
   keeping warm at an operating temperature of +30° C. to +50° C., and
   production of creamy sauces at an operating temperature of +60° C. to 90° C.

3. A small electric household utensil according to claim 1, wherein the stirring speed is different.

4. A small electric household utensil according to claim 1, wherein the individual stirring mechanisms (10) have their own drive devices (9, 28) with separate electric motors (16).

5. A small electric household utensil according to claim 1, the electric motors (16) are bipolar single-phase synchronous motors with permanent-magnetic armatures.

6. A small electric household utensil for the production of foods by mixing by stirring from original components which are slightly liquid at the start of work, in the preparation of which foods the production temperature deviates from the ambient temperature, the temperature change in the original components which is required during the production process being achieved by means of a thermal energy dispenser, the thermal energy dispenser (6) bringing the inner wall (4a) of a pot-shaped container (4, 24) to the production temperature; and a stirring tool (10) intermixing the components during the production process, at least two pot-shaped containers (4, 24) being arranged in a common surrounding container (3), in which there are thermal energy dispensers (6) in contact with the containers (4, 24), an individual stirring tool (10) being associated with each pot-shaped container (4, 24), the speed, necessary for mixing, of the respective stirring tool (10) in relation to the respective pot-shaped container (4, 24) being achieved by means of independent drive devices (9, 28) having separate electric motors (16) associated therewith, the thermal energy dispenser (6) being a thermal energy storage means, which before the start of the production process, has stored the energy necessary for the production of the foods, and then imparts this to the foods during the production process.

7. A small electric household utensil according to claim 6 wherein the electric motors (16) are bipolar single-phase synchronous motors with permanent-magnetic armatures.

8. A small electric household utensil for the production of foods by mixing original components, in the preparation of which foods the production temperature deviates from the ambient temperature, the temperature change in the original components which is required during the production process being achieved by means of a thermal energy dispenser (6) which comprises an electrically operated heating unit (26), the thermal energy dispenser (6) bringing the inner wall (4a) of pot-shaped containers (4, 24) to the production temperature; and a stirring tool (10) intermixing the components during the production process, wherein at least two pot-shaped containers (4, 24) are arranged in a common surrounding container (3), in which there are thermal energy dispensers (6) in contact with the containers (4, 24), and an individual stirring tool (10) is associated with each pot-shaped container (4, 24), the speed, necessary for mixing, of the respective stirring tool (10) in relation to the respective pot-shaped container (4, 24) being achieved by means of independent drive devices (9, 28) having separate electric motors (16) associated therewith.

9. A small electric household utensil according to claim 8 wherein the electric motors (16) are bipolar single-phase synchronous motors with permanent-magnetic armatures.

10. A small electric household utensil for the production of foods by mixing by stirring from original components in the preparation of which foods the production temperature deviates from the ambient temperature, the temperature change in the original components which is required during the production process being achieved by means of a thermal energy dispenser, the thermal energy dispenser (6) bringing the inner wall (4a) of a pot-shaped container (4, 24) to the production temperature and a stirring tool (10) intermixing the components during the production process, wherein at least two pot-shaped containers (4, 24) are arranged in a common surrounding container (3), in which there are thermal energy dispensers (6) in contact with the containers (4, 24), an individual stirring tool (10) being associated with each pot-shaped container (4, 24), the speed, necessary for mixing, of the respective stirring tool (10) in relation to the respective pot-shaped container (4, 24) being achieved by means of independent drive devices (9, 28) in the common surrounding container, the drive devices having separate electric motors (16) associated therewith.

11. A small electric household utensil according to claim 10 wherein the electric motors (16) are bipolar single-phase synchronous motors with permanent-magnetic armatures.

12. A small electric household utensil according to claim 10, both the pot-shaped containers (4, 24) and the stirring tools (10) are provided with drive devices (9, 28).

* * * * *